(12) United States Patent
Al-Muhaish et al.

(10) Patent No.: US 9,714,169 B2
(45) Date of Patent: Jul. 25, 2017

(54) CATALYST AND PROCESS FOR THERMO-NEUTRAL REFORMING OF LIQUID HYDROCARBONS

(71) Applicants: Fahad Ibrahim Al-Muhaish, Al-Khobar (SA); Shakeel Ahmed, Dhahran (SA); Roberto Carlos Pontes Bittencourt, Rio de Janeiro (BR); Mauri Jose Baldini Cardoso, Rio de Janeiro (BR); Vivian Passos De Souza, Rio de Janeiro (BR)

(72) Inventors: Fahad Ibrahim Al-Muhaish, Al-Khobar (SA); Shakeel Ahmed, Dhahran (SA); Roberto Carlos Pontes Bittencourt, Rio de Janeiro (BR); Mauri Jose Baldini Cardoso, Rio de Janeiro (BR); Vivian Passos De Souza, Rio de Janeiro (BR)

(73) Assignees: SAUDI ARABIAN OIL COMPANY, Dhahran (SA); KING FAHD UNIVERSITY OF PETROLEUM AND MINERALS, Dhahran (SA); PETROLEO BRASILEIRO S.A., Rio de Janeiro (BR)

( * ) Notice: Subject to any disclaimer, the term of this patent is extended or adjusted under 35 U.S.C. 154(b) by 0 days.

(21) Appl. No.: 15/082,531

(22) Filed: Mar. 28, 2016

(65) Prior Publication Data

US 2016/0257564 A1 Sep. 8, 2016

Related U.S. Application Data

(62) Division of application No. 13/938,376, filed on Jul. 10, 2013, now Pat. No. 9,499,403.

(51) Int. Cl.
*C01B 3/36* (2006.01)
*C01B 3/40* (2006.01)
(Continued)

(52) U.S. Cl.
CPC .............. *C01B 3/36* (2013.01); *B01J 21/10* (2013.01); *B01J 23/894* (2013.01);
(Continued)

(58) Field of Classification Search
CPC .......... C01B 3/36; B01J 37/0244; B01J 21/10
See application file for complete search history.

(56) References Cited

U.S. PATENT DOCUMENTS

| 4,088,608 A | 5/1978 | Tanaka et al. |
| 7,700,005 B2 * | 4/2010 | Inui .................... C01B 3/382 252/373 |

(Continued)

FOREIGN PATENT DOCUMENTS

| WO | 2005056179 A1 | 6/2005 |
| WO | 2010029324 A1 | 3/2010 |

OTHER PUBLICATIONS

Notification Concerning Transmittal of International Preliminary Report on Patentability for PCT/US2014/044375 mailed Jan. 21, 2016.

(Continued)

*Primary Examiner* — Matthew Merkling
(74) *Attorney, Agent, or Firm* — Abelman, Frayne & Schwab

(57) ABSTRACT

The invention relates to a four-component catalyst and a seven-component catalyst and refractory supports for use in the thermoneutral reforming of petroleum-based liquid hydrocarbon fuels.

13 Claims, 3 Drawing Sheets

(51) Int. Cl.
*B01J 21/10* (2006.01)
*C01B 3/50* (2006.01)
*B01J 23/89* (2006.01)
*B01J 37/02* (2006.01)
*B01J 35/00* (2006.01)
*B01J 35/10* (2006.01)

(52) U.S. Cl.
CPC ....... *B01J 23/8946* (2013.01); *B01J 23/8986* (2013.01); *B01J 35/002* (2013.01); *B01J 35/006* (2013.01); *B01J 35/0013* (2013.01); *B01J 35/1014* (2013.01); *B01J 35/1038* (2013.01); *B01J 35/1061* (2013.01); *B01J 37/0207* (2013.01); *B01J 37/0244* (2013.01); *C01B 3/40* (2013.01); *C01B 3/50* (2013.01); *C01B 2203/0233* (2013.01); *C01B 2203/0238* (2013.01); *C01B 2203/0261* (2013.01); *C01B 2203/047* (2013.01); *C01B 2203/0811* (2013.01); *C01B 2203/0844* (2013.01); *C01B 2203/107* (2013.01); *C01B 2203/1017* (2013.01); *C01B 2203/1047* (2013.01); *C01B 2203/1058* (2013.01); *C01B 2203/1064* (2013.01); *C01B 2203/1082* (2013.01); *C01B 2203/1247* (2013.01); *C01B 2203/1252* (2013.01); *Y02P 20/142* (2015.11); *Y02P 20/52* (2015.11)

(56) References Cited

U.S. PATENT DOCUMENTS 7,820,140 B2    10/2010  Inui et al.
8,008,226 B2    8/2011   Inui et al.
2012/0070367 A1*  3/2012  Bittencourt ............. C01B 3/326
                                                        423/656

OTHER PUBLICATIONS

M. K. Sahu et al., "A two-step process for hydrogen production from vacuum residue," International Journal of Hydrogen Energy, vol. 36, No. 2, pp. 1551-1559 (Jan. 1, 2011).

* cited by examiner

CATALYST AND PROCESS FOR THERMO-NEUTRAL REFORMING OF LIQUID HYDROCARBONS

FIELD OF THE INVENTION

This invention relates to a catalyst and a process for the reforming of petroleum-based liquid hydrocarbon fuels and, more specifically, to a multi-component catalyst and a thermo-neutral process for the reforming of petroleum-based liquid hydrocarbon fuels.

BACKGROUND OF THE INVENTION

Conventional syngas/hydrogen production technologies use mainly natural gas, LPG and light naptha as feedstocks. As yet, there is no proven catalyst to produce syngas or hydrogen from heavy liquid hydrocarbon fuels (C10+) due to the presence of a high carbon content, a high aromatic content, and sulfur which play a major role in quickly deactivating the catalyst.

With the increased demand for syngas/hydrogen for hydroprocessing in emerging transportation technologies, the need to produce syngas/hydrogen from other resources than natural gas and LPG becomes evermore important.

While the total worldwide annual production of hydrogen is over ½ trillion $m^3$ per year, the need for even greater quantities of hydrogen is still a major bottleneck, especially with the new legislative requirements and pressure to produce ultra low sulfur fuels, while available oil resources become heavier with higher contents of sulfur and metals.

The need for additional hydrogen in refineries is clearly growing, and will continue to grow at a rapid pace for the foreseeable future.

In addition, hydrogen-based fuel cells for automotive and stationary applications are gaining popularity for a variety of reasons, including their higher efficiencies and lower emissions. Nonetheless, using pure hydrogen as a fuel in automotive and residential applications faces many obstacles and has many limitations. The infrastructure to deliver hydrogen is inadequate, the refueling of gaseous hydrogen can be slow, and the storage of hydrogen is problematic. The alternatives to producing and using hydrogen range from futuristic solar energy based hydrogen generation to more pragmatic hydrocarbon reforming. Use of liquid/gaseous hydrocarbon fuels to generate hydrogen is being thought of as an immediate solution for large scale hydrogen production. Besides economics and ease of reforming, this option is seen as being more practical than utilizing the existing distribution network.

The conversion of hydrocarbon fuels to hydrogen can be carried out by several processes, including hydrocarbon steam reforming (HSR), partial oxidation reforming (POR), and auto thermal reforming (ATR). Hydrocarbon steam reforming involves the reaction of steam with the fuel in the presence of a catalyst to produce hydrogen and CO as given in equations (1) and (2) for methane, $CH_4$, and isooctane, $C_8H_{18}$(2,2,4-trimethylpentane), which is used as a surrogate for gasoline. Since steam reforming is endothermic, some of the fuel must be burned and heat transferred to the reformer via heat exchangers.

The choice of the reaction process to be used for on-board reforming depends on many factors, including the operating characteristics of the application (e.g.) varying power demand, rapid startup, and frequent shutdowns) and the type of fuel cell stack. HSR is heat transfer limited and as such does not respond rapidly to changes in the power demand (i.e., "load following"). When power demand rapidly decreases, the catalyst can overheat, causing sintering, which in turn results in a loss of activity, ATR can overcome the load following limitations of HSR, because the heat required for the endothermic reaction is generated within the catalyst bed, a property that allows for more rapid response to changing power demands and faster startup.

In order to supply the large quantity of heat necessary for steam reforming, auto thermal methods involve the a priori combustion of feedstock before entry into the catalytic reformer; the heated gas is then introduced into the catalyst bed. Therefore, the heat supply is limited by the heat capacity of the reactant gases, and does not achieve essential improvements. More recently, the combustion of a part of the hydrocarbon feed has been carried out using catalytic combustion. However, since catalytic combustion is limited by the maximum catalyst-bed temperature of around 1000-1100° C., the situation is not essentially different from a priori homogenous combustion.

While Inui et al, in U.S. Pat. Nos. 7,700,005, 7,820,140 and 8,008,226, which are incorporated herein by reference, disclose various multi-component catalysts for the thermo-neutral reforming of liquid hydrocarbons for the production of hydrogen-rich gas, and Bittencourt et al. Brazilian application PI 000656-7 A2 disclose steam reforming of fuel using a nickel-type catalyst supported on magnesium aluminate which is alkaline promoted to increase catalyst activity, the catalysts and processes of the present invention represent a distinct improvement over the prior art in avoiding deactivation of the catalysts by sulfur and coke deposition which impairs their efficiency and adds to the cost of thermo-neutral refining.

SUMMARY OF THE INVENTION

In one embodiment the invention provides a multi-component catalyst employed tier the production of hydrogen-rich synthesis gas using the thermo-neutral reforming process that can be applied to the reforming of light and heavy petroleum-based liquid hydrocarbon fuels in the presence of water and $O_2$-rich gas with low detectable catalyst deactivation due to coke formation or sulfidation by the cooperative action between the distinct catalytic functions of steam reforming and combustion. Full conversion of liquid hydrocarbon fuel has been achieved with high gaseous hourly space velocity.

Amplifying on the foregoing, the process of the present invention has been found to be efficient for producing hydrogen-rich gas by reacting with heavy liquid hydrocarbons fuels, $O_2$-rich gas and steam using a catalyst that make combustion and steam reforming reactions in combined mode. The catalysts containing several metallic components (Ni, Rh, Re and Pt) and several oxides ($Ce_2O_3$, $La_2O_3$ and $ZrO_2$) on a single refractory support consisting of one or more oxides of aluminum or silicon. The efficiency of the thermo-neutral reforming process is greatly influenced by the catalyst. A seven component catalyst (Ni, Rh, Re, Pt, $Ce_2O_3$, $La_2O_3$, $ZrO_2$) has been shown to be effective to process heavy liquid hydrocarbons, while a four component catalyst (Ni, Rh, Pt, $Ce_2O_3$) has been shown to be effective in the processing of light hydrocarbons.

In another embodiment of the invention, there is provided a method of preparing a multi-component catalyst which comprises a multi-oxide component selected from the rare earth group of metal oxide(s), such as lanthanum and cerium oxide, and may contain a member of Group IV of the Periodic Table, such as zirconium oxide, and a multimetallic component, including nickel, in combination with one or more metals selected from rhodium, rhenium and platinum supported on magnesium aluminate, calcium aluminate or mixtures thereof to form a steam reforming catalyst. Also, the incorporation therein of an alkaline metal in the catalyst support has been shown to enhance efficiency.

The present invention provides improved thermo-neutral catalysts with seven components (Ni, Rh, Re, Pt, $Ce_2O_3$, $La_2O_3$, $ZrO_2$) or, in the preferred mode, a four component catalyst (Ni, Pt, $Ce_2O_3$, $La_2O_3$) supported on magnesium aluminate and having incorporated into the catalyst support an alkaline metal, such as potassium, to increase the efficiency of the process. The catalyst structure is designed to enhance high hydrogen production, with the spillover serving to avoid both coke formation and sulfidation of catalyst metals. This provides the catalyst with the dual advantage, namely, preventing or minimizing coke formation and also as a result improving catalyst life.

In accordance with still another embodiment of the present invention, there is also provided a process for the production of hydrogen-rich syngas consisting of hydrogen and low amount carbon monoxide. The process comprises contacting vaporized liquid hydrocarbons, air/oxygen and steam over the multi-component catalyst. The process of this invention can be carried out over a wide range of operating conditions. The level of the operating conditions are dictated by the feedstock used and the level of conversion required.

The catalyst of the present invention is designed to perform thermo-neutral reforming reactions to produce syngas from liquid hydrocarbons, including LPG, light naphtha, heavy naphtha, gasoline, kerosene, diesel and their surrogate fuels. The catalyst bed can deal with very high gas hour space velocity (GHSV more than 45000 $hr^{-1}$) and because of this characteristic the reactor size can be reduced significantly compared to conventional steam reformer technology where $5000^{h-1}$ gas hour space velocity employed in industrial applications. This is an important function as it is intended to use this catalyst fix an on-board vehicle fuel processor where reactor size is very important. The intended application for this invention is to be integrated with combustion engine and fuel cell technologies for Auxiliary Power Application (APU). Also, it could be extended to other applications such as stationary hydrogen rich gas production.

DETAILED DESCRIPTION OF THE INVENTION

Figure 1:
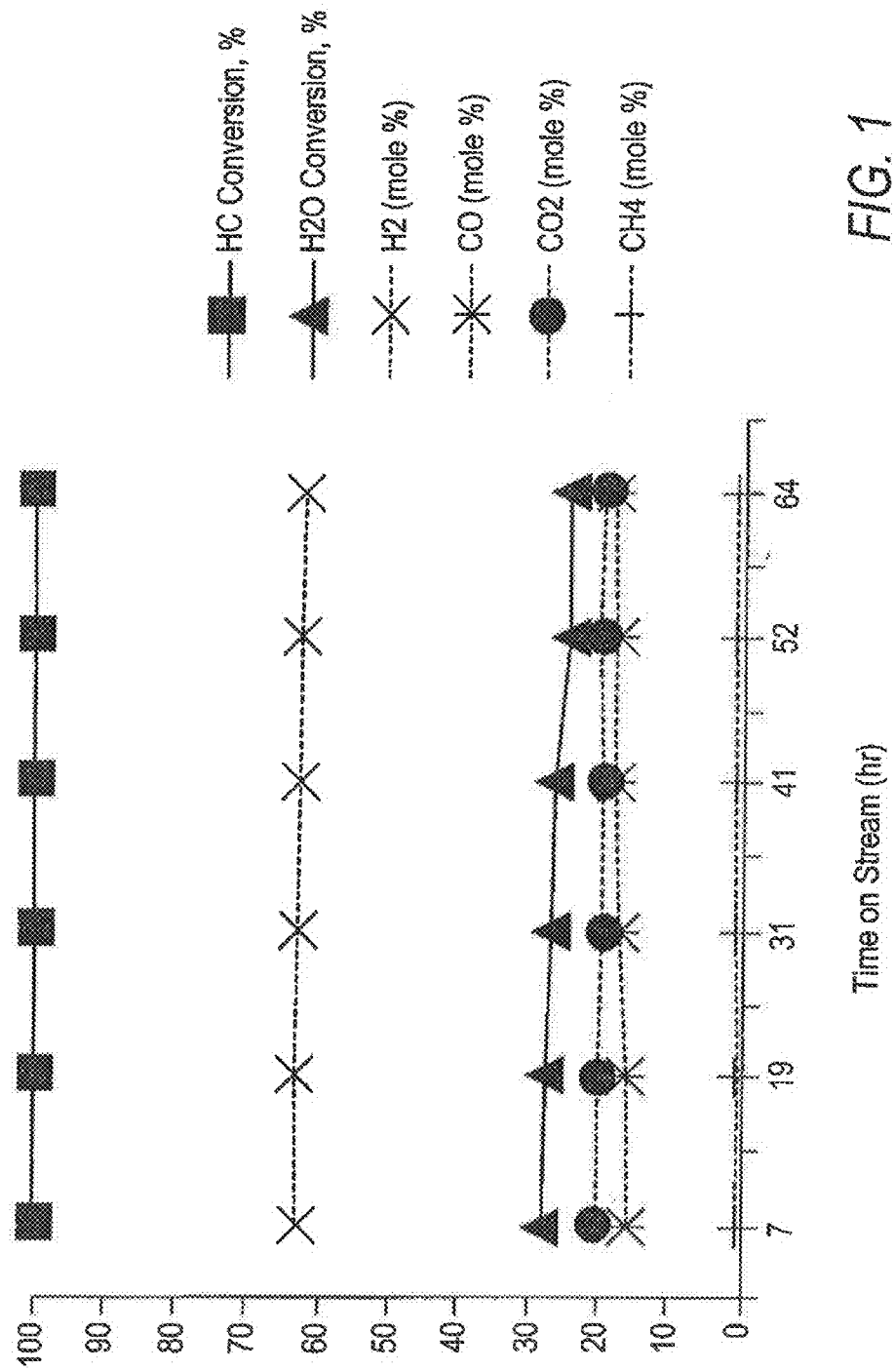
FIG. 1 is a graph showing the time on stream versus the percentages of the products converted according to the prior art method.

A catalyst of the present invention comprises oxide member(s) of the rare earth group metal oxide(s), such as lanthanum and/or cerium oxide and mixtures thereof, and/may contain a member of Group IV, such as zirconium oxide, a member selected from the group consisting of elemental nickel, a reducible compound of nickel and mixtures thereof, a member of the platinum group of metals, such as elemental platinum or a compound of platinum. Platinum group metals can be used as more than one metal, such as two or three including rhodium or compounds of rhodium and mixtures thereof. In addition, promoters from group VIIB of the periodic table, such as rhenium, can be used to enhance the efficiency of the thermoneutral reforming of the liquid hydrocarbons feedstock. The multi-component catalysts are supported on magnesium aluminate, calcium aluminate or mixtures therefore. Also, an alkaline metal, such as potassium, can be incorporated into the support to enhance the resistance to the buildup of coke on the catalyst.

The composition of the 7-component catalyst of the present invention, along with the weight range of each constituent, is as follows: 0.5-15% Ni, 0.5-10% $Ce_2O_3$, 0.5-5% $La_2O_3$, 0.1-2% Pt, 0 a 1% $ZrO_2$, 0 a 2% Rh, and 0 a 2% Re. The concentration of potassium, when present, is between 0.5 to 3.0%. The remainder of the catalyst is comprised of a refractory support containing alumina, magnesium aluminate or a mixture thereof. A refractory cement based on calcium aluminate, can also be incorporated to increase the mechanical strength of the catalyst. The specific surface area of the catalyst is from about 15 to about 125 square meters per gram, preferably above 50 square meters per gram.

The support can be provided in different shapes such as spheres, extrudates and rings with one or multiple holes and other shaped opening depending on the desired maximum pressure drop in the process. For production of $H_2$-rich gas for use in fuel cells it is preferable to use refractory supports in the form of spheres, such as those having diameters of 2-3 millimeters, simple extrudate, such as those having 1 to 4 millimeters of diameter, complex extrudates, such as trilobe or quadralobe or rasch ring, such as 10×10×4 (external diameter×height×internal diameter). A preferred form for use in the fuel cells is in the shape of a honeycomb. For large-scale production of $H_2$-rich gas, defined herein as production units with higher than 100,000 $Nm^3$/day of hydrogen, it is preferable to use the support in the form of ring with multiple holes.

A catalyst of the present invention can be prepared in accordance with various methods. The seven component catalyst, which is understood as containing Ni, Rh, Re, Pt, $Ce_2O_3$, $La_2O_3$ and $ZrO_2$, is preferably prepared by a multiple step sequence of impregnation, calcination and reduction of the multi-components on the support. The catalyst impregnation is carried out using an aqueous solution of a soluble salt component, preferably nitrates. The preferred order of impregnation is to first impregnate the rhodium and rhenium metal salts which decompose upon subsequent heat treatment to form the corresponding oxides. After the impregnation, the composite material is dried at about 120° C. at a slow rate of heating, preferably at a rate of about 0.5° C. per minute and then maintaining the temperature at 120° C. for about one hour. The temperature is then raised to about 250° C. at the same rate, and the temperature is then maintained at 250° C. for about 1.5 hours. All the heat treatment is done with air or $O_2$-rich gas. Optionally, after the impregnation the catalyst is treated at 60° C. for 10 to 30 minutes with ammonia-rich gas before the $O_2$-rich gas heat treatment. The first step in catalyst preparation ends with a $O_2$-rich gas reduction at a temperature from 400° C. to 450° C. for 2 hours. The second step is carried out in a manner similar to the first step with the use of salts of Pt and Zr. The third step is carried out similarly to the first and second stages with the use of salts of Ni, Ce and La. Optionally, the reduction step in the third step is conducted between 400 and 1100° C., preferably 700° C. to 800° C.

A preferred embodiment of the invention is a four component catalyst, which is understood as containing multi-components Ni, Pt, $Ce_2O_3$, $La_2O_3$. The four component catalyst is preferably prepared by a single step impregnation, calcination and optionally reduction. The refractory support is impregnated with an aqueous solution containing a soluble salt, preferably nitrates, of Ni, Ce, La and Pt. After the impregnation, the composite material is dried at about 120° C. at a slow rate of heating, preferably at a rate of about 0.5° C. per minute and then maintaining the temperature at 120° C. for about one hour. The temperature is then raised to about 250° C. at the same rate, and the temperature is then maintained at 250° C. for about 1.5 hours. The heat treatment is done with air or $O_2$-rich gas. Optionally, after impregnation the catalyst is treated at 60° C. for 10 to 30 minutes with ammonia-rich gas before the $O_2$-rich gas heat treatment. The final catalyst preparation step is calcination at 400 to 450° C. in air or $O_2$-rich gas. Optionally, the final stage of preparation may be a reduction while flowing $H_2$ or gas rich in $H_2$ with 400° C. to 1100° C., preferably from 400 to 500° C., for 2 hours. Depending on the volume of the pores in the support, it may be necessary to perform more than one step of impregnation, drying and calcination to obtain the desired content of all the components.

The present invention provides a significantly improved multi-component catalyst that is employed in a process for the production of hydrogen-rich gas from liquid petroleum fractions, such as light naphtha, kerosene and diesel while reacting with water vapor and oxygen-rich gas in a fixed bed reactor. The catalysts perform simultaneously the catalytic functions of endothermic steam reforming and exothermic combustion with high efficiency of the thermoneutral reforming and with low detectable deactivation. The heat produced from catalytic combustion induces the endothermic steam reforming of hydrocarbons on the same catalysts surface leading to ultra-rapid reforming.

The catalyst prepared in accordance with the present invention has the desired properties of: (1) being capable of complete oxidation of the hydrocarbon feedstock by consuming all the oxygen supplied, and generating a high heat of combustion reaction; (2) being very active for the steam reforming reaction which is endothermic, consuming the heat generated by the oxidation reaction and providing true thermoneutral reforming; (3) having a very long active life without any or low detectable deactivation, and (4) being able to process liquid hydrocarbons ranging from light naphtha to diesel at a very high rate of conversion to syngas. The good performance of the catalyst is believed to be associated with the occurrence of oxygen and hydrogen spillover by active phases on the surface of the catalyst associated with a support of high thermal and hydrothermal resistance and properties of low coke deposition.

In accordance with another embodiment of the present invention, there is also provided a process for the production of hydrogen-rich syngas consisting of hydrogen and carbon monoxide with less than 1.5 vol % methane and carbon dioxide. The process comprises contacting vaporized liquid hydrocarbons, air/oxygen and steam over the multi-component catalyst. The process of the present invention can be carried out over a wide range of operating conditions. The level of the operating conditions are dictated by the feedstock used and the level of conversion required. The process of the present invention is used to produce hydrogen-rich gas from low sulfur middle distillate petroleum fractions (e.g., heavy naphtha, kerosene, and diesel) without the need for prior desulfurization at high gaseous hourly space velocity, while still maintaining full liquid hydrocarbon conversion under these conditions.

The heat transfer between the exothermic and endothermic reaction performed directly on the same catalyst bed associated with high activity and stability of the catalyst in accordance with the present invention, allows the required catalytic reactor volume for liquid hydrocarbon reforming in this invention to be less than 1/20 the size of a conventional steam reforming reactor, and less than 1/10 the size of an auto thermal reformer. Moreover, the large furnace needed to heat the reactor, as required in conventional hydrocarbon steam reforming can be eliminated.

In accordance with the present invention, the use of the magnesium aluminate support yields a thermo-neutral catalyst with higher activity, a reduced tendency to accumulate coke and a higher level of durability than the prior art based on alumina type supports. The excellent properties of the support allows for the simplification of the procedure for preparing the catalyst, reducing the content of noble metal, preferably Rh and Re are not used in the catalyst formulation, which is of benefit in reducing the production cost of the catalyst.

In general, the subject invention provides the following advantages:
1. Simplified and/or less catalyst preparation steps
2. Lower catalyst cost
3. Higher liquid hydrocarbon conversion which is important for intended application
4. Required crystallite size was achieved with simplified and/or less catalyst preparation steps
5. Higher Surface area which gives indication on better catalyst performance
6. Higher pore volume and pore diameter which enhances heavy hydrocarbon conversion
7. Higher rate of dehydrogenation activity which gives indication on better catalyst performance
8. Higher methane conversion which gives indication on better catalyst performance Each of the inventions will now be described in greater detail in the examples, including specific embodiments and versions, but the inventions are not limited to these embodiments, versions or examples, which are included to enable a person having ordinary skill in the art to make and use the present inventions.

The following examples are presented to illustrate the nature of the present invention and the manner of practicing the same, without, however, may be considered limiting, of its contents. Two examples are given along with one example from the prior art to demonstrate the present invention. For each example, the details of the catalyst preparation method, catalyst hydrogenation activity test, catalyst steam reforming activity test, crystallite size measurement, physical properties measurement and catalyst performance evaluation with heavy naphtha feed are given.

Example 1 (Prior Art Method)

Catalyst Preparation Method:

This example describes the preparation of a seven multi-component catalyst for use in the Thermo-Neutral process reformed in accordance with the prior art (U.S. Pat. No. 7,700,005).

The catalyst was prepared by impregnating alumina spheres of diameter in the range of about 2 to about 4 millimeters and surface area of the support is from about 85 square meters per gram. One hundred and thirty-one grams of support-type alumina were impregnated with 75.6 ml of aqueous solution containing 0.84 grams of rhodium nitrate III (CAS 10139-58-9—Sigma Aldrich, product code 83750) and 0.59 grams of rhenium oxide VII (CAS 1314-68-7—Sigma Aldrich product code 1314-68-7). The catalyst was dried from ambient temperature to 60° C. at a rate of 0.5° C./min and then exposed to 60° C. for 10 minutes at an NH3-rich atmosphere. Then the catalyst was thermally treated for 60° C. up to 120° C. at a rate of 1° C./min and after for 120° C. up to 350° C. at a rate of 1.4° C./min. The catalyst was then reduced in flowing $H_2$ at 430° C., cooled to 30° C. to 60° C. and exposed to a flow of air to passivation to obtain Rh—Re/alumina sample.

A small amount of this sample was taken for process control. One hundred and eleven grams of the sample Rh—Re/alumina was impregnated with 70.3 ml of aqueous solution containing 2.53 grams of zirconium oxynitrate hydrate (CAS 12985-18-3 Sigma Aldrich product code 380679) and 1.82 grams of tetraaminoplatino chloride (II) monohydrate (CAS 13933-33-0 Alfa Aesar product code 10836). The steps of drying, calcination and hydrogen reduction were carried out similarly to the preparation of Rh—Re/Alumina sample to obtain the $PtZrO_2$/Rh—Re/alumina sample.

A small amount of this sample was taken for process control again. One hundred grams of the Pt—$ZrO_2$/Rh—Re/alumina sample was impregnated with 63.3 ml aqueous solution containing 2.97 grams of lanthanum nitrate hexahydrate (CAS 10277-43-7 Alfa Aesar, product code 44346), 8.87 grains of cerium (III) nitrate (CAS 10294-41-4, Sigma Aldrich, product code 392219) and 33.23 grams of nickel nitrate hexahydrate (CAS 0277-43-7, Sigma Aldrich, code product 203874). The steps of drying and calcination were carried out similarly to the preparation of $PtZrO_2$/Rh—Re/alumina.

The catalyst was then reduced in flowing $H_2$ at 430° C. and them from 430° C. to 1160° C., cooled to 30° C. and exposed to a flow of air to passivation to obtain the multi-component catalyst Ni—$Ce_2O_3$—$La_2O_3$/Pt—$ZrO_2$/Rh—Re/alumina sample. The final catalyst had a nominal composition of (% w/w):0.2% Rh; 0.3% Re, 0.8% Pt, 1.0 $ZrO_2$, 1.0 $La_2O_3$, 6% Ni, 3% $Ce_2O_3$ supported on stable alumina.

| Examples | Catalyst Components | Catalyst Prep. Steps (Summary) |
|---|---|---|
| Prior art | Ni—$Ce_2O_3$—$La_2O_3$—Pt—$ZrO_2$—Rh—Re supported on alumina | 1. Three impregnation steps and final reduction at 1160° C. 2. Ammonia treatment is needed |

Catalyst Hydrogenation Activity Test

The purpose of this experiment is to assess the metal functionality through measuring the metallic area of the catalysts. It was estimated by the activity measurement in the reaction of dehydrogenation of cyclohexane. The conversion of cyclohexane was carried out in unit microactivity using the following conditions: mass of catalyst of 0.1 grains at a particle size 60-270 mesh; $H_2$ flow between 40 to 80 ml/min; cyclohexane fed via saturator maintained at 10° C.; atmospheric pressure and reaction temperature between 330° C. to 390° C. Before the reaction the catalysts were pretreated in flow (40 ml/min) for 2 hours at 550° C. The reactants and products were analyzed by gas chromatography (HP 5890) using Plot Al2O3/KCl column operating at 150° C. The activity was expressed as total conversion of cyclohexane and as the dehydrogenation reaction rate, given by the expression R=X Fao/W, where X=conversion to benzene, W=mass of catalyst (g) and flow Fao=molar cyclohexane (mol/s).

| Examples | Rate of Dehydrogenation Activity |
|---|---|
| Prior art | 16.4 |

Catalyst Steam Reforming Activity Test

The purpose of this experiment is to assess the steam reforming functionality of catalyst using methane. The experiments were conducted in commercial equipment (AutoChem II, Micromeritcs). The tests were conducted using 200 mg of crushed catalyst in the range smaller than 170 mesh. The catalysts were pretreated in the temperature of 650° C. and atmospheric pressure by passing 40 ml/min of a gas containing hydrogen and 10% saturated with water vapor at 50° C. The activity of steam reforming of methane measurement was performed at 500° C. atmospheric pressure and steam/carbon ratio of 2.3 mol/mol. The effluent gases from the reactor were analyzed by gas chromatography and the activity measured by the degree of conversion of methane (X %).

| Examples | Steam Reforming Conversion (%) |
|---|---|
| Prior art | 26 |

Crystallite Size Measurement

This is to illustrate that the catalyst in accordance with the present invention prepared using magnesium aluminate, as disclosed in Examples 2 and 3, provides a nickel with reduced dimensions in the crystallite size that is not higher than the nickel obtained using the prior art with the most expensive support alumina. The metallic nickel crystal size was estimated by (peak: 200) DRX diffraction lines. It is believed that small size in particular of metallic nickel contributes to have a lower deactivation by coke formation.

| Examples | Crystallite Size (nm) |
|---|---|
| Prior art | 17 |

Physical Properties

This is to illustrate high metal BET surface area, pore volume and pore size in accordance with the present invention

| Examples | Surface Area (m²/g) | Pore Volume (cm³/g) | Pore Diameter (Å) |
|---|---|---|---|
| Prior art | 45.2 | 0.24 | 106 |

Notes:
Sbet = specific surface area by $N_2$ adsorption;
Vp = pore volume by N2 desorption (BJH distribution);
dm = pore average diameter (by 4 V/A)

Catalyst Performance Evaluation with Heavy Naphtha

Catalyst performance evaluation was conducted with heavy naphtha fuel at micro-reactor unit. The properties of the heavy naphtha feed are as follow:

| Fuel Name Heavy Naphtha | | | |
|---|---|---|---|
| Heating Value (BTU/lb) | | | |
| 19606 | Density @ 60° F. (g/cc) | | 0.7543 |
| | Sulfur | | |
| <2 ppm | Viscosity (cSt) | @ 77° F. | |
| PIONA (vol %) | SIMIDIS (° F.) | @ 104° F. | |
| Aromatics | 8.317 | IBP | 188 |
| Naphthenes | 38.163 | 05% | 194 |
| Oxygenates | 0.000 | 10% | 201 |
| Paraffins | 8.000 | 20% | 220 |
| i-Paraffins | 41.503 | 30% | 235 |
| Olefins | 3.025 | 40% | 246 |
| Unidentified | 0.992 | 50% | 257 |
| % Recovered | 100 | 60% | 273 |
| % Residue | 0 | 70% | 285 |
| | | 80% | 295 |
| | | 90% | 314 |
| | | 95% | 324 |
| | | FBP | 340 |

Catalyst evaluation was carried out in a fixed-bed flow reactor system. The reaction system consisted of gas and liquid feed sections, a preheating section, a reactor section and a product collection section. Gases were fed through mass flow controllers; liquid feeds were pumped by precision HPLC pumps. The reactor tube was 17.5 mm in diameter and was made of Haynes 230 alloy. A three-zone electric furnace, whose temperatures were monitored and controlled by temperature controllers, heated the reactor system. Thermocouples were provided to measure the inner temperature of the reactor. Water and heavy naphtha were vaporized in pre-heaters and were mixed with air in a static mixer before entering the reactor. The product collection section consisted of a pressure control valve, a gas-liquid separator, a liquid level controller and a product tank. 6 ml of the catalyst was loaded and positioned at the center of the reactor tube, between layers of inert silicon carbide. The top portion of silicon carbide layer also served as a preheating zone.

The feed mixture was heated up to 350° C. in the preheating zone. The reactor was heated up to the starting temperature of 410° C. under nitrogen flow of 20 l/h. Water was pumped into the pre-heater and vaporized, and steam was sent in at a flow rate corresponding to a steam-to-hydrocarbon feed ($H_2O/C$) molar ratio of 2.1. The hydrocarbon feed was pumped with $O_2/C$ ratio of 0.5. The total gas hour space velocity (GHSV) was about 45000 $hr^{-1}$. The reactor temperature increased to about 800-820° C. in a few seconds without external heating. A gas sample was collected and analyzed in two gas chromatographs, one equipped with TCD and the other with FID. The experiment was conducted for more than 60 hours and the graph shown in FIG. 1 and Table 1 demonstrates overall results.

TABLE 1

| Example 1 | Prior art Experimental Results | | | | | |
|---|---|---|---|---|---|---|
| Run ID | 1 | 2 | 3 | 4 | 5 | 6 |
| Time on Stream, hour | 7.0 | 19.0 | 30.9 | 41.2 | 51.6 | 64.1 |
| Conditions | | | | | | |
| GHSV, h−1 | 45941 | 46096 | 46527 | 47052 | 48054 | 46767 |
| Oxygen/Carbon ratio | 0.5 | 0.5 | 0.5 | 0.5 | 0.5 | 0.5 |
| Steam/Carbon ratio | 2.3 | 2.2 | 2.2 | 2.2 | 2.2 | 2.2 |
| Steady State Reaction T, ° C. | 800 | 800 | 800 | 800 | 805 | 803 |
| Results | | | | | | |
| HC Conversion, % | 100 | 100 | 100 | 100 | 100 | 100 |
| $H_2O$ Conversion, % | 27.9 | 27.5 | 26.5 | 26.0 | 24.4 | 24.2 |
| $H_2/(CO + CO_2)$ | 1.7 | 1.7 | 1.7 | 1.7 | 1.7 | 1.7 |
| Product Composition (l/h) | | | | | | |
| $H_2$ | 108.1 | 105.9 | 106.8 | 101.8 | 103.0 | 99.1 |
| CO | 27.2 | 27.1 | 28.9 | 28.5 | 28.4 | 28.9 |
| $CO_2$ | 35.2 | 33.8 | 33.0 | 31.3 | 32.9 | 30.8 |
| $CH_4$ | 1.3 | 1.1 | 1.2 | 1.1 | 0.9 | 1.1 |
| N2 | 111 | 109 | 113 | 114 | 121 | 110 |
| Dry Gas (without $N_2$) (mole %) | | | | | | |
| $H_2$ | 62.9 | 63.1 | 62.9 | 62.6 | 62.3 | 62.0 |
| CO | 15.8 | 16.1 | 17.0 | 17.5 | 17.2 | 18.1 |
| $CO_2$ | 20.5 | 20.1 | 19.4 | 19.2 | 19.9 | 19.3 |
| $CH_4$ | 0.8 | 0.7 | 0.7 | 0.7 | 0.6 | 0.7 |
| Product Gas (mole %) | | | | | | |
| $H_2$ | 38.2 | 38.3 | 37.7 | 36.8 | 36.0 | 36.7 |
| CO | 9.6 | 9.8 | 10.2 | 10.3 | 9.9 | 10.7 |
| $CO_2$ | 12.5 | 12.2 | 11.7 | 11.3 | 11.5 | 11.4 |
| $CH_4$ | 0.5 | 0.4 | 0.4 | 0.4 | 0.3 | 0.4 |
| $N_2$ | 39.3 | 39.3 | 40.0 | 41.2 | 42.3 | 40.8 |

Example 2 (Present Invention with 7-Component Catalyst A))

Catalyst Preparation Method:

This example is in accordance with the present invention describes the preparation of seven multi-component catalyst using magnesium aluminate as a support. The magnesium aluminate, was prepared by calcination a commercial hydrotalcite (SudChemie, product code T-2701 1/16 inch, with 30% w/w of MgO in alumina balance) at 1050° C. in air for 4 hours. The support had a surface area 67.6 m2/g, pore volume of 0.35 cm3/g by $N_2$ adsorption and 0.9 $cm^3$/g by water absorption and standard X-ray diffraction characteristic of the magnesium aluminate. The catalyst was prepared in a manner identical to Example 1 except final reduction step was conducted at 730° C. instead of 1160° C. The final catalysts had a nominal composition of (% w/w): 0.2% Rh; 0.3% Re, 0.8% Pt, 1.0 $ZrO_2$, 1.%) $La_2O_3$, 6% Ni, 3% $Ce_2O_3$ supported on magnesium aluminate.

| Examples | Catalyst Components | Catalyst Prep. Steps (summary) |
|---|---|---|
| A | Ni—$Ce_2O_3$—$La_2O_3$—Pt—$ZrO_2$—Rh—Re supported on Magnesium Aluminate | 1. Three impregnation steps and final reduction at 730° C. 2. Ammonia treatment is needed |

Catalyst Hydrogenation Activity Test:

The purpose of this experiment is to assess the metal functionality measuring the metallic area of the catalysts. It was estimated by the activity measurement in the reaction of dehydrogenation of cyclohexane. The conversion of cyclohexane was carried out in unit microactivity using the following conditions: mass of catalyst of 0.1 grams at a particle size 60-270 mesh; $H_2$ flow between 40 to 80 ml/min; cyclohexane fed via saturator maintained at 10° C.; atmospheric pressure and reaction temperature between 330° C. to 390° C. Before the reaction the catalysts were pretreated in $H_2$ flow (40 ml/min) for 2 hours at 550° C. The reactants and products were analyzed by gas chromatography (HP 5890) using Plot $Al_2O_3$/KCl column operating at 150° C. The activity was expressed as total conversion of cyclohexane and as the dehydrogenation reaction rate, given by the expression R=X Fao/W, where X=conversion to benzene, W=mass of catalyst (g) and flow Fao=molar cyclohexane (mol/s).

| Examples | Rate of Dehydrogenation Activity |
|---|---|
| A | 31 |

Catalyst Steam Reforming Activity Test

The purpose of this experiment is to assess the steam reforming functionality of catalyst using methane. The experiments were conducted in commercial equipment (AutoChem II, Micromeritcs). The tests were conducted using 200 mg of crushed catalyst in the range smaller than 170 mesh. The catalysts were pretreated in the temperature of 650° C. and atmospheric pressure by passing 40 ml/min of a gas containing hydrogen and 10% saturated with water vapor at 50° C. The activity of steam reforming of methane measurement was performed at 500° C. atmospheric pressure and steam/carbon ratio of 2.3 mol/mol. The effluent gases from the reactor were analyzed by gas chromatography and the activity measured by the degree of conversion of methane (X %).

| Examples | Steam Reforming Conversion (%) |
|---|---|
| A | 31 |

Crystallite Size Measurement

This is to illustrate that the catalyst in accordance with the present invention prepared using the magnesium aluminate provides a nickel with reduced dimensions in the crystallite size that is not higher than the nickel obtained using the prior art with the most expensive support alumina. The metallic nickel crystal size was estimated by (peak: 200) DRX diffraction lines. It is believed that small size in particular of metallic nickel contributes to have a lower deactivation by coke formation.

| Examples | Crystallite Size (nm) |
|---|---|
| A | 16 |

Physical Properties

This is to illustrate high metal BET surface area, pore volume and pore size in accordance with the present invention.

| Examples | Surface Area ($m^2$/g) | Pore Volume ($cm^3$/g) | Pore Diameter (Å) |
|---|---|---|---|
| A | 66.7 | 0.28 | 169 |

Notes:
Sbet = specific surface area by N2 adsorption;
Vp = pore volume by N2 desorption (BJH distribution);
dm = pore average diameter (by 4 V/A)

Catalyst Evaluation with Heavy Naphtha

Catalyst evaluation was tested with heavy naphtha fuel at micro reactor unit. Heavy naphtha feed properties as follow:

| Fuel Name Heavy Naphtha | | | |
|---|---|---|---|
| Heating Value (BTU/lb) | | | |
| 19606 | | Density @ 60° F. (g/cc) | 0.7543 |
| | | Sulfur | |
| <2 ppm PIONA (vol %) | | Viscosity (cSt) SIMIDIS (° F.) | @ 77° F. @ 104° F. |
| Aromatics | 8.317 | IBP | 188 |
| Naphthenes | 38.163 | 05% | 194 |
| Oxygenates | 0.000 | 10% | 201 |
| Paraffins | 8.000 | 20% | 220 |
| i-Paraffins | 41.503 | 30% | 235 |
| Olefins | 3.025 | 40% | 246 |
| Unidentified | 0.992 | 50% | 257 |
| % Recovered | 100 | 60% | 273 |
| % Residue | 0 | 70% | 285 |
| | | 80% | 295 |
| | | 90% | 314 |
| | | 95% | 324 |
| | | FBP | 340 |

Figure 2:
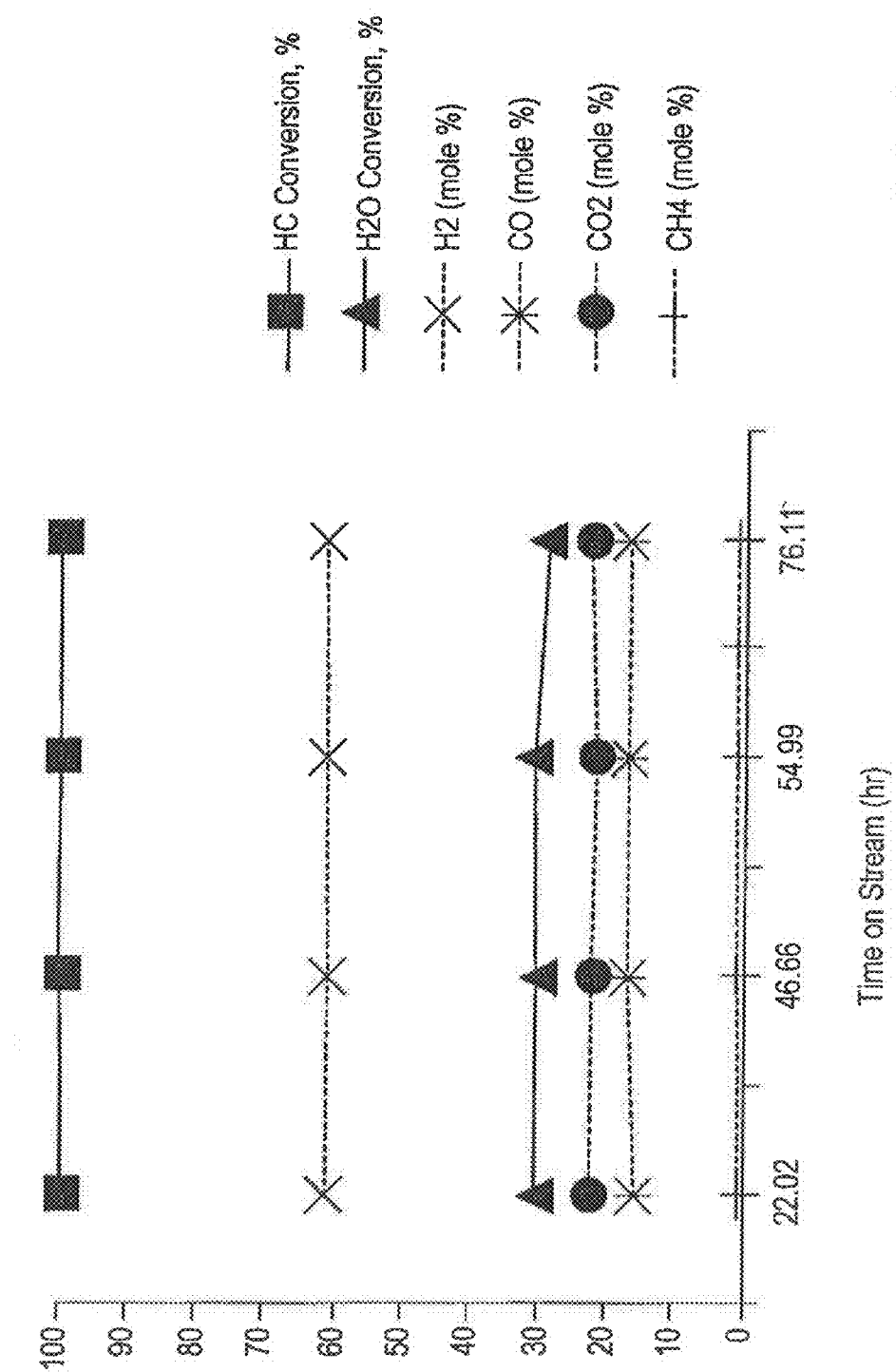
FIG. 2 is a graph showing the time on stream versus the percentages of the products converted when using the four component catalyst of the present invention.

Catalyst evaluation was carried out in a fixed-bed flow reactor system. The reaction system consisted of gas and liquid feed sections, a preheating section, a reactor section and a product collection section. Gases were fed through mass flow controllers; liquid feeds were pumped by precision HPLC pumps. The reactor tube was 17.5 mm in diameter and was made of Haynes 230 alloy. A three-zone electric furnace, whose temperatures were monitored and controlled by temperature controllers, heated the reactor system. Thermocouples were provided to measure the inner temperature of the reactor. Water and heavy naphtha were vaporized in pre-heaters and were mixed with air in a static mixer before entering the reactor. The product collection section consisted of a pressure control valve, a gas-liquid separator, a liquid level controller and a product tank. 6 ml of the catalyst was loaded and positioned at the center of the reactor tube, between layers of inert silicon carbide. The top portion of silicon carbide layer also served as a preheating zone. The feed mixture was heated up to 350° C. in the preheating zone. The reactor was heated up to the starting temperature of 410° C. under nitrogen flow of 20 l/h, Water was pumped into the pre-heater and vaporized, and steam was sent in at a flow rate corresponding to a steam-to-hydrocarbon feed ($H_2O$/C) molar ratio of 2.1. The hydrocarbon feed was pumped with O2/C ratio of 0.5. The total gas hour space velocity (GHSV) was about 4500 $hr^{-1}$. The reactor temperature increased to about 800-820° C. in a few seconds without external heating. A gas sample was collected and analyzed in two gas chromatographs, one equipped with TCD and the other with FID. The experiment was conducted for more than 60 hours and the following graph in FIG. 2 and Table 2 demonstrate the overall results.

TABLE 2

| Example 2 | Prior art Experimental Results | | |
|---|---|---|---|
| Run ID | 1 | 2 | 3 |
| Time on Stream, hour | 22.0 | 46.7 | 76.1 |
| Conditions | | | |
| GHSV, h-1 | 43539 | 43504 | 43606 |
| Oxygen/Carbon ratio | 0.5 | 0.5 | 0.5 |
| Steam/Carbon ratio | 2.2 | 2.2 | 2.2 |
| Steady State Reaction T, ° C. | 800 | 800 | 800 |
| Results | | | |
| HC Conversion, % | 100 | 100 | 100 |
| $H_2O$ Conversion, % | 29.7 | 29.7 | 30.2 |
| $H_2$/(CO + $CO_2$) | 1.6 | 1.6 | 1.6 |
| Product Composition (l/h) | | | |
| $H_2$ | 112.3 | 106.1 | 105.5 |
| CO | 28.2 | 28.2 | 28.6 |
| $CO_2$ | 40.1 | 37.3 | 36.8 |
| $CH_4$ | 1.5 | 1.5 | 1.8 |
| $N_2$ | 144.9 | 136.7 | 136 |
| Dry Gas (without $N_2$) (mole %) | | | |
| $H_2$ | 61.7 | 61.3 | 61.1 |
| CO | 15.5 | 16.3 | 16.6 |
| $CO_2$ | 22.0 | 21.6 | 21.3 |
| $CH_4$ | 0.8 | 0.9 | 1.0 |
| Product Gas (mole %) | | | |
| $H_2$ | 34.3 | 34.2 | 34.2 |
| CO | 9.4 | 10.0 | 10.2 |
| $CO_2$ | 12.3 | 12.0 | 11.9 |
| $CH_4$ | 0.5 | 0.5 | 0.6 |
| $N_2$ | 44.3 | 44.1 | 44.1 |

Example 3 (Present Invention with 4-Component Catalyst B)

Catalyst Preparation Method:

This example, which is in accordance with the present invention describes the preparation of multi-component catalyst having four components using magnesium aluminate, promoted with K as a support. The support of magnesium aluminate was prepared as: 200 grams of commercial hydrotalcite (SudChemie, product code T-2701 1/16 inch, with 30% w/w of MgO in alumina balance) were impregnated with 180 ml of an aqueous solution containing 7.37 g of potassium hydroxide. The material was dried overnight at 100° C. and then calcined at 1050° C. in air for 4 hours. The support had a surface area 85.7 $m^2$/g and pore volume of 0.70 $cm^3$/g. 174 grams of the prepared support was impregnated with 140 ml of aqueous solution containing 0.70 g of tetraaminoplatino chloride (II) monohydrate (CAS 13933-33-0 Alfa Aesar product code 10836), 5.14 grams of lanthanum nitrate hexahydrate (CAS 10277-43-7 Alfa Aesar, product code 44346), 15.36 grams of cerium (III) nitrate (CAS 102.94-41-4, Sigma Aldrich, product code 392219) and 57.51 grams of nickel nitrate hexahydrate (CAS 10277-43-7, Sigma Aldrich, code product 203874). The catalyst was dried from ambient temperature to 120° C. at a rate of 1° C./min and after for 120° C. up to 350° C. at a rate of 1.4° C./min. The catalyst was then reduced in flowing $H_2$ at 730° C., cooled to 30° C. and exposed to a flow of air to passivation to obtain Pt—Ni—$Ce_2O_3$—$La_2O_3$/K-magnesium aluminate catalyst. The final catalysts had a nominal composition of (% w/w): 1.0% Pt, 1.0 $La_2O_3$, 6% Ni, 3% $Ce_2O_3$, 2.7% $K_2O$, supported in magnesium aluminate,

| Examples | Catalyst Components | Catalyst Prep. Steps (summary) |
|---|---|---|
| B | Pt—Ni—$La_2O_3$—$Ce_2O_3$ supported K promoted Magnesium Aluminate | 1. One impregnation step and final reduction at 730° C.<br>2. No Ammonia treatment<br>3. Promoter (such as K) is added |

Catalyst Hydrogenation Activity Test:

The purpose of this experiment is to assess the metal functionality through measuring the metallic area of the catalysts. It was estimated by the activity measurement in the reaction of dehydrogenation of cyclohexane. The conversion of cyclohexane was carried out in unit microactivity using the following conditions: mass of catalyst of 0.1 grams at a particle size 60-270 mesh; $H_2$ flow between 40 to 80 ml/min; cyclohexane fed via saturator maintained at 10° C.; atmospheric pressure and reaction temperature between 330° C. to 390° C. Before the reaction the catalysts were pretreated in $H_2$ flow (40 ml/min) for 2 hours at 550° C. The reactants and products were analyzed by gas chromatography (HP 5890) using Plot $Al_2O_3$/KCl column operating at 150° C. The activity was expressed as total conversion of cyclohexane and as the dehydrogenation reaction rate, given by the expression R=X Fao/W, where X=conversion to benzene, W=mass of catalyst (g) and flow Fao=molar cyclohexane (mol/s).

| Examples | Rate of Dehydrogenation Activity |
|---|---|
| B | 18 |

Catalyst Steam Reforming Activity Test

The purpose of this experiment is to assess the steam reforming functionality of catalyst using methane. The experiments were conducted in commercial equipment (AutoChem II, Micromerites). The tests were conducted using 200 mg of crushed catalyst in the range smaller than 170 mesh. The catalysts were pretreated in the temperature of 650° C. and atmospheric pressure by passing 40 ml/min of a gas containing hydrogen and 10% saturated with water vapor at 50° C. The activity of steam reforming of methane measurement was performed at 500° C. atmospheric pressure and steam/carbon ratio of 2.3 mol/mol. The effluent gases from the reactor were analyzed by gas chromatography and the activity measured by the degree of conversion of methane (X %).

| Examples | Steam Reforming Conversion (%) |
|---|---|
| A (New Invention) | 36 |

Crystallite Size Measurement

This is to illustrate that the catalyst in accordance with the present invention prepared using the magnesium aluminate provides a nickel with reduced dimensions in the crystallite size that is not higher than the nickel obtained using the prior art with the most expensive support alumina. The metallic nickel crystal size was estimated by (peak: 200) DRX diffraction lines. It is believed that small size in particular of metallic nickel contributes to have a lower deactivation by coke formation.

| Examples | Crystallite Size (nm) |
|---|---|
| B | 14 |

Physical Properties

This is to illustrate high metal BET surface area, pore volume and pore size in accordance with the present invention.

| Examples | Surface Area ($m^2/g$) | Pore Volume ($cm^3/g$) | Pore Diameter (Å) |
|---|---|---|---|
| B | 77.5 | 0.38 | 170 |

Notes:
Sbet = specific surface area by N2 adsorption;
Vp = pore volume by N2 desorption (BJH distribution);
dm = pore average diameter (by 4 V/A)

Catalyst Evaluation with Heavy Naphtha

Catalyst evaluation was tested with heavy naphtha fuel at micro-reactor unit. Heavy naphtha feed properties as follow:

| Fuel Name Heavy Naphtha | | | | |
|---|---|---|---|---|
| Heating Value (BTU/lb) | | | | |
| 19606 | Density @ 60° F. (g/cc) | | 0.7543 | |
| | Sulfur | | | |
| | | | | @ 77° F. |
| <2 ppm | Viscosity (cSt) | | | @ 104° F. |
| PIONA (vol %) | SIMIDIS (° F.) | | | |
| Aromatics | 8.317 | IBP | | 188 |
| Naphthenes | 38.163 | 05% | | 194 |
| Oxygenates | 0.000 | 10% | | 201 |
| Paraffins | 8.000 | 20% | | 220 |
| i-Paraffins | 41.503 | 30% | | 235 |
| Olefins | 3.025 | 40% | | 246 |
| Unidentified | 0.992 | 50% | | 257 |
| % Recovered | 100 | 60% | | 273 |
| % Residue | 0 | 70% | | 285 |
| | | 80% | | 295 |
| | | 90% | | 314 |
| | | 95% | | 324 |
| | | FBP | | 340 |

Catalyst evaluation was carried out in a fixed-bed flow reactor system. The reaction system consisted of gas and liquid feed sections, a preheating section, a reactor section and a product collection section.

Figure 3:
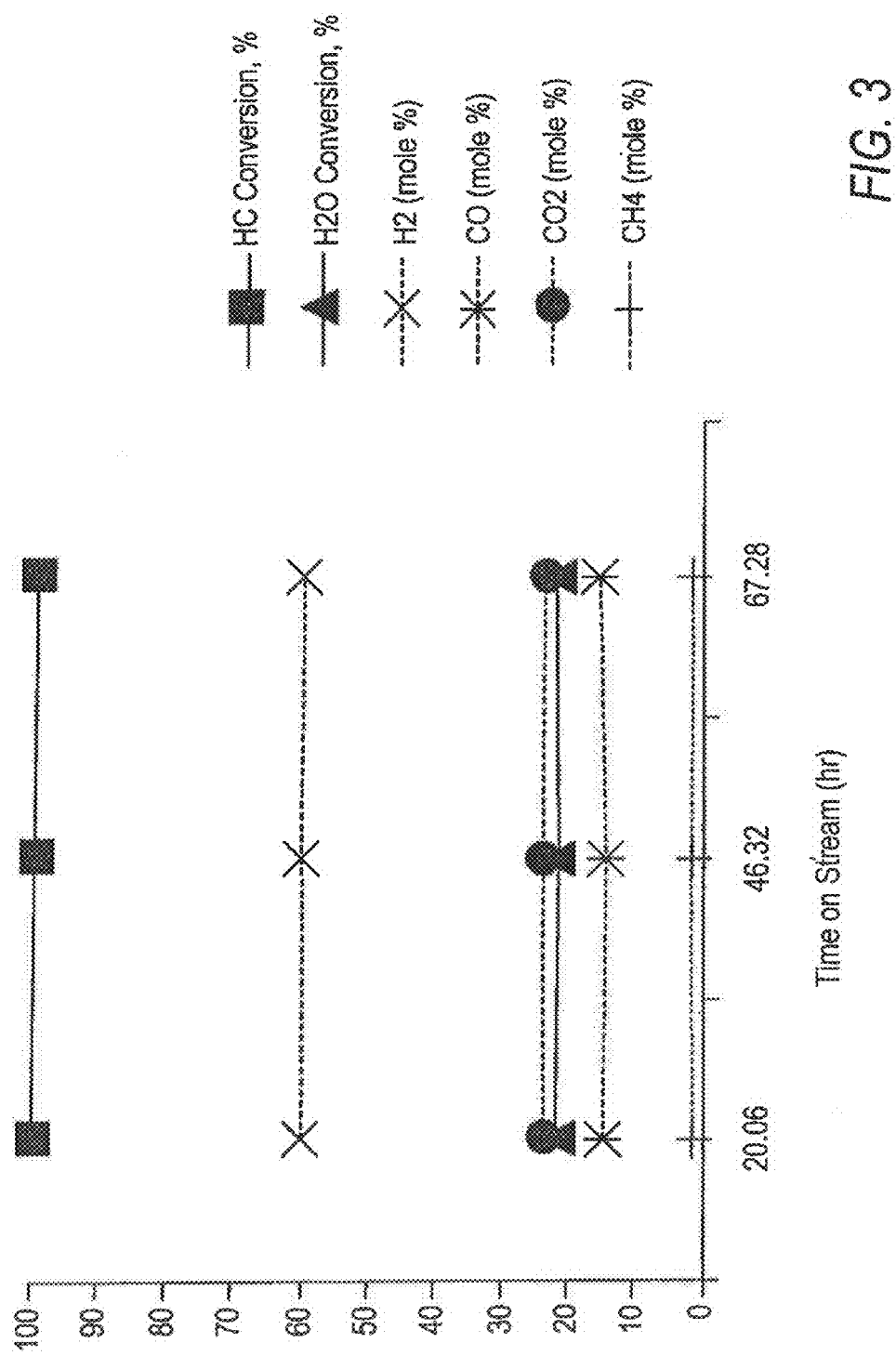
FIG. 3 is a graph showing the time on stream versus the percentages of the products converted when using the seven component catalyst of the present invention.

Gases were fed through mass flow controllers; liquid feeds were pumped by precision HPLC pumps. The reactor tube was 17.5 mm in diameter and was made of Haynes 230 alloy. A three-zone electric furnace, whose temperatures were monitored and controlled by temperature controllers, heated the reactor system. Thermocouples were provided to measure the inner temperature of the reactor. Water and heavy naphtha were vaporized in pre-heaters and were mixed with air in a static mixer before entering the reactor. The product collection section consisted of a pressure control valve, a gas-liquid separator, a liquid level controller and a product tank 6 ml of the catalyst was loaded and positioned at the center of the reactor tube, between layers of inert silicon carbide. The top portion of silicon carbide layer also served as a preheating zone. The feed mixture was heated up to 350° C. in the preheating zone. The reactor was heated up to the starting temperature of 410° C. under nitrogen flow of 20 l/h. Water was pumped into the pre-heater and vaporized, and steam was sent in at a flow rate corresponding to a steam-to-hydrocarbon feed ($H_2O/C$) molar ratio of 2.1. The hydrocarbon feed was pumped with $O_2/C$ ratio of 0.5. The total gas hour space velocity (GHSV) was about 45000 hr-1. The reactor temperature increased to about 800-820° C. in a few seconds without external heating. A gas sample was collected and analyzed in two gas chromatographs, one equipped with TCD and the other with FID. The experiment was conducted for more than 60 hours and the following graph in FIG. 3 and Table 3 demonstrate the overall results.

TABLE 3

| Example 3 | Prior art Experimental Results | | |
|---|---|---|---|
| Run ID | 1 | 2 | 3 |
| Time on Stream, hour | 20.1 | 46.3 | 67.3 |
| Conditions | | | |
| GHSV, h-1 | 42974 | 42968 | 43047 |
| Oxygen/Carbon ratio | 0.5 | 0.5 | 0.5 |
| Steam/Carbon ratio | 2.2 | 2.1 | 2.1 |
| Steady State Reaction T, ° C. | 840 | 830 | 832 |

TABLE 3-continued

| Example 3 | Prior art Experimental Results | | |
|---|---|---|---|
| Run ID | 1 | 2 | 3 |
| Results | | | |
| HC Conversion, % | 100 | 99 | 99 |
| $H_2O$ Conversion, % | 21.7 | 21.8 | 21.9 |
| $H_2/(CO + CO_2)$ | 1.5 | 1.6 | 1.5 |
| Product Composition (l/h) | | | |
| $H_2$ | 91.8 | 91.0 | 90.7 |
| CO | 22.6 | 22.0 | 23.4 |
| $CO_2$ | 36.7 | 36.4 | 35.9 |
| $CH_4$ | 2.5 | 2.4 | 2.5 |
| $N_2$ | 140 | 138 | 141 |
| Dry Gas (without $N_2$) (mole %) | | | |
| $H_2$ | 59.8 | 59.9 | 59.5 |
| CO | 14.7 | 14.5 | 15.3 |
| $CO_2$ | 23.9 | 24.0 | 23.5 |
| $CH_4$ | 1.6 | 1.6 | 1.6 |
| Product Gas (mole %) | | | |
| $H_2$ | 31.3 | 31.4 | 30.9 |
| CO | 8.3 | 8.2 | 8.7 |
| $CO_2$ | 12.5 | 12.6 | 12.3 |
| $CH_4$ | 0.8 | 0.8 | 0.9 |
| $N_2$ | 47.7 | 47.6 | 48.0 |

Set forth in Table 4 below is a comparison of the properties of the catalyst of the prior art and of the present invention, as well as certain process parameters of the prior art and the present invention.

What is claimed is:

1. A thermoneutral reforming process for the production of a hydrogen-rich synthesis gas from liquid hydrocarbon fuels, which comprises:
   a. providing a mixture of a liquid hydrocarbon fuel, an $O_2$ rich gas or air and steam to an interior zone of a reactor, said interior zone including a catalyst bed consisting of a $Ni$—$Ce_2O_3$—$Pt$—$La_2O_3$ combined combustion and steam and/or $CO_2$ reforming catalyst supported on magnesium aluminate and containing a potassium compound as a promoter;
   b. pre-heating the mixture to a temperature of about 350° C. to about 450° C.; and
   c. bringing the mixture into contact with the catalyst bed at a gas hour space velocity of about 30,000 $h^{-1}$ to about 70,000 $h^{-1}$ causing an exothermic combustion reaction raising the reaction temperature to about 800° C. to about 900° C. and also causing an endothermic steam reforming reaction for a period of time sufficient to reform the liquid fuel to yield a hydrogen-rich synthesis gas.

2. The process of claim 1, wherein the liquid hydrocarbon fuel is a petroleum-based fuel.

3. The process of claim 2, wherein the petroleum-based liquid is selected from the group consisting of paraffins, light naphtha, heavy-naphtha, kerosene and diesel.

4. The process of claim 1, wherein the gas hour space velocity is between about 35,000 and about 50,000 $h^{-1}$.

5. The process of claim 1, wherein the heat generated from the exothermic combustion reaction is neutralized and compensated for by the endothermic reaction on the same catalyst bed.

TABLE 4

| Examples | Catalyst Components | Catalyst Prep. Steps | Cost | Liquid Hydrocarbon Conversion | Crystallite size (nm) | Surface Area ($m^2/g$) | Pore Volume ($cm^3/g$) | Pore Diameter (Å) | Rate of dehydrogenation activity | Steam Reforming Cconversion (%) |
|---|---|---|---|---|---|---|---|---|---|---|
| Prior art | Ni—$Ce_2O_3$—$La_2O_3$—Pt—$ZrO_2$—Rh—Re supported on alumina | 1. Three impregnation steps and final reduction at 1160° C. 2. Ammonia treatment is needed | High | 100% | 17 | 45.2 | 0.24 | 106 | 16.4 | 26 |
| A (New invention) | Ni—$Ce_2O_3$—$La_2O_3$—Pt—$ZrO_2$—Rh—Re supported on Magnesium Aluminate | 1. Three impregnation steps and final reduction at 730° C. 2. Ammonia treatment is needed | Low | 100% | 16 | 66.7 | 0.28 | 169 | 31 | 31 |
| B (New invention) | Pt—Ni—$La_2O_3$—$Ce_2O_3$ Supported K promoted Magnesium Aluminate | 4. One impregnation step and final reduction at 730° C. 5. No Ammonia treatment 6. Promoter (such as K) is added | Very Low | 100% | 14 | 77.5 | 0.38 | 170 | 18 | 36 |

6. The process of claim 1, wherein the reaction is carried out without the need of an external heat supply.

7. The process of claim 1, wherein coke formation is avoided.

8. The process of claim 3, wherein about 99% of the liquid petroleum based fuels is converted into syngas ($H_2$/CO/$CO_2$/$CH_4$).

9. The process of claim 1, wherein the syngas produced from the process can be further purified to produce highly pure hydrogen.

10. The process of claim 1, wherein the hydrogen rich syngas is used as a feed for on-board reformers in vehicles incorporating a high temperature or low temperature fuel cell.

11. The process of claim 1, wherein the hydrogen-rich syngas is used as a feed for hydrogen enrichment in internal combustion engines.

12. The process of claim 1, wherein the hydrogen-rich syngas is employed in stationary applications.

13. The process of claim 1, wherein the sulfur content of the liquid hydrocarbons fuel is 200 ppm or less.

* * * * *